Nov. 2, 1937.　　　　H. BENNETT　　　　2,097,753
BALANCE
Filed Jan. 23, 1936
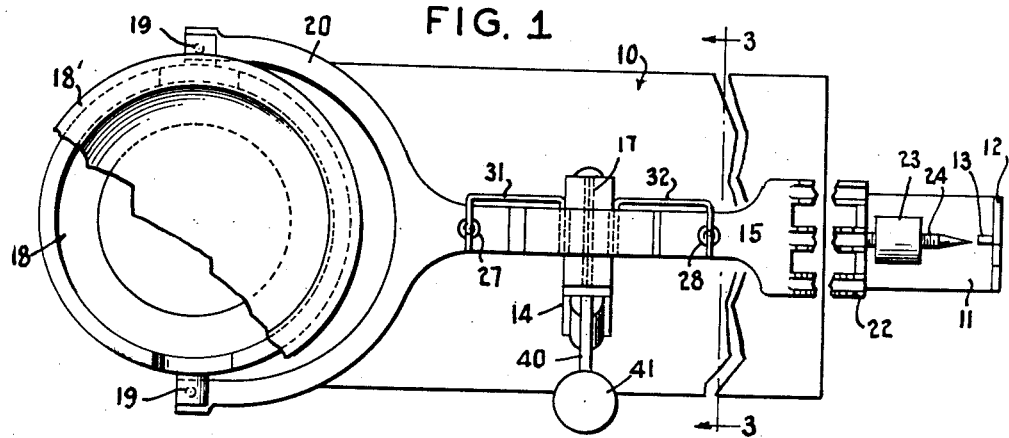
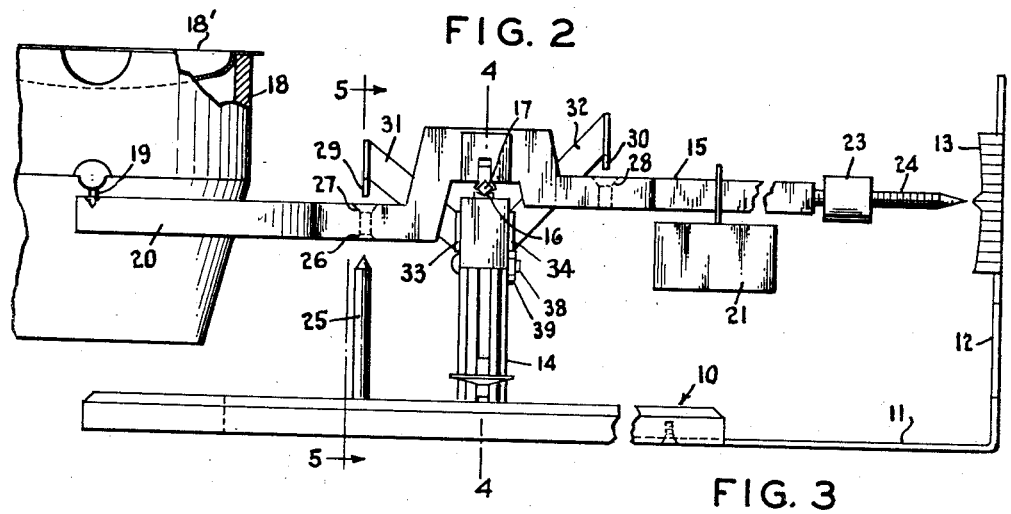
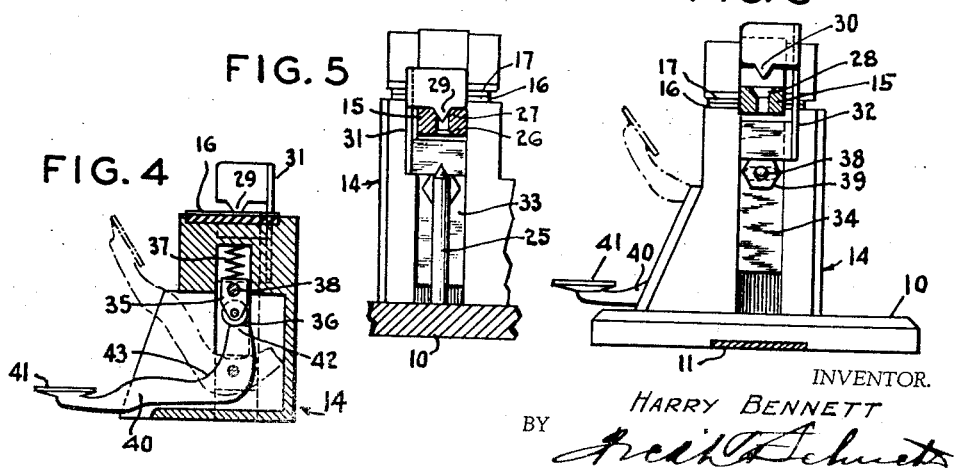
INVENTOR.
HARRY BENNETT
BY
ATTORNEY.

Patented Nov. 2, 1937

2,097,753

UNITED STATES PATENT OFFICE 2,097,753

BALANCE

Harry Bennett, New York, N. Y.

Application January 23, 1936, Serial No. 60,401

6 Claims. (Cl. 265—49)

The invention relates to balances, more especially to the delicate type of balance suitable for use in chemical analyses, and weighing operation requiring a sensitivity of approximately 1/100 of a gram.

It has for an object the provision of a compact balance which is sufficiently accurate and sensitive for ordinary purposes yet occupies considerably less space than the usual type of balance utilized in laboratory work.

A further object of the invention resides in the provision of a balance of novel and rugged construction which will admit of ready dismantling for storage or shipment purposes when thus dismantled, and is inexpensive to manufacture.

Still another object of the invention resides in certain details of construction in the means for temporarily locking the knife-edge of the balance beam to its bearing and releasing the same therefrom, together with means for accurately centering said knife-edge when the balance is to be put into service.

Another object of the invention resides in the mounting of the locking and releasing means in the standard for supporting the beam rather than in the base, as is the usual practice, and thereby securing further economy of space of the apparatus.

In carrying out the invention, a suitable lightweight beam is provided to which is pivoted at one end a suitable container for the material to be weighed, while the other end is arranged to receive a sliding weight or weights and is provided also with a pointer or index designed to cooperate with a suitably positioned scale supported from the base of the balance.

From the base projects upwardly a standard or support designed to mount a bearing for a knife-edge fulcrum of the beam and also to receive or house mechanism for releasing the knife-edge for use, as in operating a key or finger piece projecting outwardly from the standard conveniently to an operator.

The nature of the invention, however, will best be understood when described in connection with the accompanying drawing, in which:

Fig. 1 is a plan view of the novel balance, and Fig. 2 is a front elevation thereof.

Fig. 3 is a vertical section through the balance taken on the line 3—3, Fig. 1 of the drawing, and looking in the direction of the arrow.

Fig. 4 is a vertical section through the fulcrum locking mechanism taken on the line 4—4, Fig. 2 of the drawing, and looking in the direction of the arrow.

Fig. 5 is a similar section, taken on the line 5—5, Fig. 2, and illustrates the locking action of the fulcrum locking mechanism.

Referring to the drawing, 10 designates a suitable base or supporting member for the balance and from the under side of which base extends at one end the bracket 11 with upstanding portion 12 carrying a scale 13. By screwing, for example, the inner end of this bracket to the underside of the base 10, it becomes readily removable as for minimizing space in shipping a balance.

From the base 10 extends upwardly at right angles thereto a standard 14 for supporting the beam 15 of the balance. To this end, there extends transversely of the standard at its top an open-ended V-groove bearing element 16 designed to receive and center the fulcrum or knife-edge 17 carried by the beam 15, so that the latter pivots about said fulcrum on the bearing 16.

At the end of one of its arms, the beam is designed to carry pivotally a member for retaining material to be weighed in the balance, for example the pot 18 which is removably hung on pivotal trunnions 19 on the opposite arms 20 of the forked end of the beam, thus insuring the length of the arm being maintained irrespective of the movement of such arm. Furthermore, a flanged pan 18' may be arranged to seat on the rim of said pot 18 for use in certain forms of weighings; and the rim of the pot is indicated as being diametrically notched to receive, for example, a test tube (not shown) and containing material to be weighed.

Adjustable weights 21 are arranged to slide in slots 22 provided in the arm of the beam opposite the weighing arm for effecting the weighing operation; and an adjustable counterweight 23 is threadedly mounted on a pointer member 24 projecting from the arm for initially balancing the scale. Pointer 24 is designed to coact with the arcuate scale 13 in balancing material to be weighed, as is well understood.

To limit the amount of swing of the beam, its one arm carrying the pot 18 is limited in its downwardly swing by a rod 25 upstanding from the base 10 and pointed at its free end which is designed to enter the tapered socket or recess 26 of the lower side of said arm. This recess may be continued through the arm to afford a further and tapered recess 27 at the top, while the opposite arm of the beam 15 is similarly provided with a tapered recess 28 at its upper surface. The purpose of these upper recesses is to receive respective teeth 29 and 30 of corresponding locking arms 31 and 32 designed to hold the beam, or rather its fulcrum 17, securely in position in the angular bearing 16 when the balance is not in use.

To this end, the arms 31 and 32 are reciprocably associated with standard 14 in being mounted through extension slide pieces 33 and 34 upon opposite sides of the standard, which is grooved along its opposite sides to slidably receive therein these extension slide pieces. Said arms 31 and 32, moreover, are displaced to a position behind the beam while the teeth 29 and 30 are on portions at right angles to said arms and overhanging the opposite arms of the beam, respectively, so that when the balance is in use, these teeth will be aligned over the respective recesses 27 and 28.

When the balance is not desired for use, provision is made for depressing teeth 29 and 30 into their respective recesses 27 and 28 (Fig. 5). This may be effected through a reciprocating mechanism mounted within the standard, which is hollowed out for this purpose, and is provided with outer respective grooves vertically slotted. Within the hollowed-out portion of the standard is mounted a vertical slide member 35 bearing at its lower end an anti-friction roller 36, while against its upper end acts a coil spring 37 located between said slide and the upper portion of the standard to urge constantly said slide in a downward direction. The slide 35 is connected to the two slide pieces 33 and 34 to cause the same to move therewith. For example, a bolt 38 is passed transversely through the one slide piece 33, then through the slide 35 and the other slide piece 34, being held at this end by a nut 39.

A pivoted key member 40 is mounted in the base of the standard and has a finger piece 41 extending through the front of the standard for depressing the said key. Its inner end is provided with a bearing surface 42 to receive the roller 36 which is positioned slightly off center with respect to said surface to lock thereby the slide 35 with its slide piece in its uppermost position and against the action of coil spring 37. This corresponds to the service position of the balance in which the teeth 29 and 30 are withdrawn from their sockets or recesses 27 and 28, thus permitting the beam 15 to oscillate freely. However, when the beam is to be fixed in position with its fulcrum 17 held firmly to the bearing 16, the key is raised to the dotted position indicated in Figs. 3 and 4, which causes the spring 37 to force the slide 35 downwardly, roller 36 riding over the curved edge 43 of the key until it seats in the bottom portion in which it will be maintained and the fulcrum held in its bearing until the balance is again required for service. It will be observed that as soon as the key has been moved past the center line of the roller's 36 vertical movement, the roller will tend to force the key into the locking position aforesaid. It is also to be noted that when the beam is released, it may conveniently be withdrawn forwardly from its support on the standard, as in case of dismantling for shipping purposes, cleaning, or convenient storage.

I claim:

1. A balance comprising a base, an oscillatable beam mounted upon a suitable standard extending upwardly from the base, said beam being provided with recesses in the upper surface of its opposite arms, and means movably carried by the standard for engaging said recesses in the beam to hold the latter firmly to the said standard.

2. A balance comprising a base, an oscillatable beam mounted upon a suitable standard extending upwardly from the base, said beam being provided with recesses in the upper surface of its opposite arms, and a pair of arms reciprocably mounted on the standard, located behind the beam and having extensions overhanging the opposite arms of said beam with teeth adapted to engage the respective recesses.

3. A balance comprising a base, an oscillatable beam mounted upon a suitable standard extending upwardly from the base, said beam being provided with recesses in the upper surface of its opposite arms, a pair of arms reciprocably mounted on the standard behind the beam and having extensions overhanging the opposite arms of said beam, a key pivoted to the standard for elevating the reciprocable arms, and means tending normally to move said key in a direction to depress the said reciprocable arms for engagement with the beam.

4. A balance comprising a base, an oscillatable beam mounted upon a suitable standard extending upwardly from the base, said beam being provided with recesses in the upper surface of its opposite arms, a pair of arms reciprocably mounted on the standard, located behind the beam and having extensions overhanging the opposite arms of said beam, a slide reciprocably mounted in the standard and connected with said reciprocable arms, a key pivoted to the standard for engagement with said slide, and resilient means urging said slide toward the key.

5. A balance comprising a base, an oscillatable beam mounted upon a suitable standard extending upwardly from the base, said beam being provided with recesses in the upper surface of its opposite arms, a pair of arms reciprocably mounted on the standard, located behind the beam and having extensions overhanging the opposite arms of said beam, a slide reciprocably mounted in the standard and connected with said reciprocable arms, a key pivoted to the standard for engagement with said slide, and the inner end of the key being designed to swing to one side of the path of travel of said slide and also adapted for engagement therewith, and resilient means urging said slide toward the said end.

6. A balance comprising a base, an oscillatable beam mounted upon a suitable standard extending upwardly from the base, said beam being provided with recesses in the upper surface of its opposite arms, the one recess extending through the beam, means movably carried by the standard for engaging said recesses in the upper surface, and a pin extending upwardly from the base to fit into the recess end at the underside of the beam.

HARRY BENNETT.